(12) United States Patent
Banham (10) Patent No.: US 11,211,849 B2
(45) Date of Patent: Dec. 28, 2021

(54) ELECTRIC MACHINE WITH FLUID COOLED STATOR ASSEMBLY

(71) Applicant: Rolls-Royce Corporation, Indianapolis, IN (US)

(72) Inventor: Christopher Banham, Indianapolis, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 390 days.

(21) Appl. No.: 16/176,969

(22) Filed: Oct. 31, 2018

(65) Prior Publication Data

US 2020/0136470 A1    Apr. 30, 2020

(51) Int. Cl.
*H02K 9/19* (2006.01)
*H02K 1/20* (2006.01)

(52) U.S. Cl.
CPC .......... *H02K 9/19* (2013.01); *H02K 1/20* (2013.01); *H02K 2209/00* (2013.01)

(58) Field of Classification Search
CPC ........ H02K 1/20; H02K 2209/00; H02K 9/19; H02K 5/20
See application file for complete search history.

(56) References Cited

U.S. PATENT DOCUMENTS

| | | | |
|---|---|---|---|
| 2,632,861 A * | 3/1953 | Morton | H02K 1/185 310/431 |
| 2,695,368 A | 11/1954 | Kilbourne | |
| 3,061,386 A | 10/1962 | Dix et al. | |
| 3,648,085 A | 3/1972 | Fujii | |
| 3,700,271 A | 10/1972 | Blaurock et al. | |
| 4,134,036 A * | 1/1979 | Curtiss | H02K 1/185 310/216.113 |
| 4,790,683 A | 12/1988 | Cramer, Jr. et al. | |
| 4,828,423 A | 5/1989 | Cramer, Jr. et al. | |
| 5,189,325 A | 2/1993 | Jarczynski | |
| 5,859,482 A * | 1/1999 | Crowell | H02K 5/20 310/54 |
| 5,873,710 A * | 2/1999 | Tucker | F04C 23/008 417/410.5 |
| 5,897,107 A | 4/1999 | Zierden et al. | |
| 6,261,061 B1 | 7/2001 | Pfaffenberger | |
| 6,288,878 B1 | 9/2001 | Misso et al. | |
| 6,313,556 B1 | 11/2001 | Dombrovski et al. | |
| 6,754,046 B2 | 6/2004 | Barina et al. | |

(Continued)

FOREIGN PATENT DOCUMENTS

| | | | | |
|---|---|---|---|---|
| GB | 2375220 A | 11/2002 | | |
| WO | WO-8807284 A1 * | 9/1988 | ............... | H02K 5/20 |

OTHER PUBLICATIONS

Machine translation of WO8807284A1 (Year: 1988).*

(Continued)

*Primary Examiner* — Bernard Rojas
(74) *Attorney, Agent, or Firm* — Shumaker & Sieffert, P.A.

(57) ABSTRACT

In some examples, an electric machine system including an outer housing; a stator assembly within the outer housing; a corrugated ring located between the stator assembly and the outer housing, the corrugated ring defining a gap between the stator assembly and the outer housing; and a pump configured to transfer a fluid through the gap between the stator assembly and housing to remove heat from at least one of the stator assembly or outer housing.

18 Claims, 7 Drawing Sheets

(56) References Cited

U.S. PATENT DOCUMENTS

| | | | |
|---|---|---|---|
| 7,923,890 B2* | 4/2011 | Boardman, IV | H02K 1/185 |
| | | | 310/216.129 |
| 9,062,700 B2 | 6/2015 | Pennsiriwongse | |
| 9,306,432 B2 | 4/2016 | Coldwate et al. | |
| 2006/0208589 A1 | 9/2006 | Foshage et al. | |
| 2008/0043374 A1* | 2/2008 | Hanrahan | G11B 5/4813 |
| | | | 360/265.6 |
| 2014/0077635 A1* | 3/2014 | Hossain | H02K 9/22 |
| | | | 310/64 |
| 2016/0084258 A1 | 3/2016 | Dreschel et al. | |
| 2019/0081529 A1* | 3/2019 | Rehr | H02K 1/20 |
| 2020/0083764 A1* | 3/2020 | Tran | H02K 1/20 |

OTHER PUBLICATIONS

Dykas et al., "Design, Fabrication, and Performance of Foil Gas Thrust Bearings for Microturbomachinery Applications," Turbo Expo 2008 Gas Turbine Technical Congress and Exposition sponsored by the American Society of Mechanical Engineers, Jan. 2008, 18 pp.

\* cited by examiner

ELECTRIC MACHINE WITH FLUID COOLED STATOR ASSEMBLY

TECHNICAL FIELD

The disclosure relates electric machines such as electric motors and electric generators.

BACKGROUND

An electric machine, such as an electric motor or an electric generator, coverts electromechanical energy using electromagnetic forces. For example, an electric motor may convert electricity to mechanical power while an electric generator may convert mechanical power to electricity. An electric machine may include a rotor and stator assembly within a machine housing. The rotor may rotate within the stationary stator assembly during operation, e.g., to generate electricity or mechanical power.

SUMMARY

In some examples, the disclosure describes systems and techniques relating to electric machine systems such as electric generator systems and electric motor systems including a rotor that rotates within a stator assembly. An outer housing of the electric machine may at least partially surround the stator assembly in a nested configuration. The stator assembly may be secured within the housing by one or more corrugated rings around the stator assembly and located between the stator assembly and outer machine housing. The corrugated ring(s) may form a radial gap between machine housing and stator assembly. During operation of the electric machine system or other time, a fluid may be transferred, e.g., pumped via a pump, within the gap to remove heat from the stator assembly and/or housing. In some examples, the electric machine system may employ a heat exchanger to remove heat from the fluid after the fluid is transferred through the gap between the housing and stator assembly, after which the fluid may be transferred again through the gap in a closed loop manner.

In one example, the disclosure describes an electric machine system comprising an outer housing; a stator assembly within the outer housing; a corrugated ring located between the stator assembly and the outer housing, the corrugated ring defining a gap between the stator assembly and the outer housing; and a pump configured to transfer a fluid through the gap between the stator assembly and housing to remove heat from at least one of the stator assembly or outer housing.

In another example, the disclosure describes a method comprising transferring a fluid through a gap between a stator assembly and an outer housing of an electric machine, the fluid being transferred to remove heat from at least one of the stator assembly or housing, wherein the electric machine includes the outer housing, the stator assembly within the outer housing, and a corrugated ring located between the stator assembly and the outer housing, the corrugated ring defining a gap between the stator assembly and the outer housing.

The details of one or more examples are set forth in the accompanying drawings and the description below. Other features, objects, and advantages will be apparent from the description and drawings, and from the claims.

DETAILED DESCRIPTION

The disclosure describes, in some examples, systems and techniques relating to electric machine systems such as electric generator systems and electric motor systems including a rotor that rotates within a stator assembly. The stator assembly may be nested within a generally cylindrical cavity within an outer machine housing and the rotor may rotate within the stator assembly. The rotor may be rotatable within the stationary stator assembly, e.g., to generate electricity or mechanical energy.

In some examples, the stator assembly may be press fit (also referred to as an interference fit or frictional fit) within the generally cylindrical cavity of the outer machine housing to secure the stator assembly to the outer machine housing. However, differences in thermal expansion and contraction of the stator assembly and adjacent outer machine housing during operational life of the electric machine may cause the press fit to fail or otherwise loosen, for example, under torque force applied to the stator assembly. Furthermore, the heat generated by the electric machine during operation may lead to an undesirable increase in temperature of the stator assembly and/or outer machine housing during operation.

In accordance with examples of the disclosure, an electric machine may include a generally cylindrical stator assembly that is mounted or otherwise secured to an outer machine housing via a press fit using one or more corrugate rings positioned between the outer circumference of the stator assembly and inner wall of the surrounding outer machine housing. The corrugated ring may define an undulating member that alternates between peaks and valleys around the radius of the stator assembly. The undulating nature of the corrugated ring(s) provides for a radial "spring" which transfers forces between the stator assembly and outer machine housing, allowing for expansion and contraction between the stator assembly and outer machine housing while maintaining a secure attachment between the mounted two components.

Furthermore, the undulating nature of the corrugated ring(s) defines a gap between the opposing surfaces of the stator assembly and adjacent wall of the machine housing. To remove heat, e.g., from the stator assembly, that is generated during operation or otherwise, a fluid may be transferred through the gap, e.g., by a pump, over the surfaces of the stator assembly and outer machine housing. In some examples, the rate of fluid flow through the gap may be control, e.g., via processing circuitry, to control the temperature of the stator assembly and outer housing before, during, and/or after the electric machine operates. In this manner, the electric machine system may allow for a secure connection between the stator assembly and outer machine housing using the one or more corrugated rings while also cooling (or otherwise removing heat) the electric machine using the gap between the stator assembly and outer machine housing provided by the corrugated rings.

In some examples, the disclosure relates to systems and techniques in which an electric machine employs a corrugated ring (e.g., split corrugated ring separated by one or more anti-rotation keys) to hold concentric two nested cylindrical members (e.g., an inner stator assembly and outer housing) with a radial gap between the members allowing transfer of a fluid medium (e.g., liquid fluid medium) therebetween. The fluid medium in such an application may be configured to provide heat transfer (e.g., cooling) by removing heat from the stator assembly and/or outer housing. Examples of the disclosure, e.g., in which an electric machine stator assembly is mounted within an outer housing via one or more corrugated rings, may provide relatively high efficiency heat transfer by locating the stator assembly concentric to the housing, maintaining concentricity during thermal growth of members and application of radial force, transferring torque between the stator assembly and housing, allowing a fluid transfer path through a suitable radial gap, e.g., formed by corrugated ring(s), and exposing a high percentage of cylindrical surface area for fluid convection heat transfer.

Figure 1:
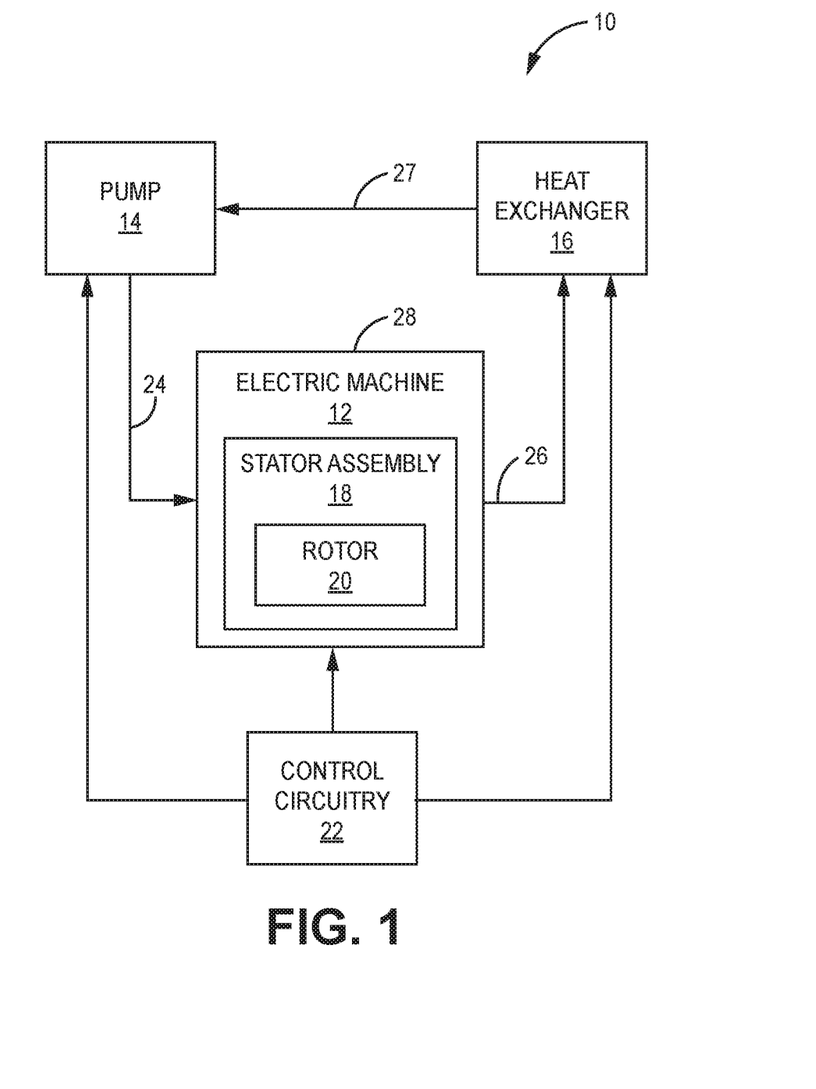
FIG. 1 is a conceptual and schematic block diagram illustrating an example electric machine system.

FIG. 1 is a conceptual and schematic block diagram illustrating example electric machine system 10 in accordance with some examples of the disclosure. As shown, electric machine system 10 includes electric machine 12, pump 14, optional heat exchanger 16, and control circuitry 22. Electric machine 12 includes machine housing 28, stator assembly 18, and rotor 20. As described below, during operation, rotor 20 is rotatable about a longitudinal axis within stator assembly 18 while stator assembly 18 remain substantially stationary relative to the rotation of rotor 20. Stator assembly 18 may be secured and substantially fixed relative to machine housing 28 of electric machine 12.

In some examples, electric machine 12 may take the form of an electric generator configured to generate electricity by converting mechanical energy into electrical power. For example, to generate electricity, rotator 20 may be rotated, e.g., via a suitable turbine such as a gas turbine, about its longitudinal axis within the surrounding stator 18. The rotation of rotor 20 may generate a magnetic field, which induces an electric current within one or more conductor windings (not shown in FIG. 1) of stator assembly 18. In some examples, electric machine 12 may include a direct-current (DC) generator or an alternating-current (AC) generator such as an induction generator. Electric machine 12 may include an array of permanent magnets fixed onto rotor 20 in various configurations. The electrical energy produced by electric machine system 10 may be used in a variety of ways or for a variety of systems and applications that rely on electrical energy to operate.

In other examples, electric machine 12 may take the form of an electric motor configured to generate mechanical energy by converting electrical energy into mechanical energy. For example, to generate mechanical energy, a current may flow through one or more conductor winding of stator assembly 18. The mechanical energy produced by electric machine system 10 may be used in a variety of ways or for a variety of systems and applications (e.g., aircraft, locomotives, watercraft, power plants, electric generators, and any or all other systems and applications that rely on mechanical energy from a turbine engine to perform work).

For ease of illustration, electric machine 12 is illustrated as including stator assembly 18 and rotor 20 at least partially enclosed within machine housing 12. However, it is understood that electric machine 12 may include one or more additional components for electric machine 12 to operate as an electric generator or electric motor. Similarly, for ease of illustration, electric machine system 10 may include one more additional devices or components other than those shown in FIG. 1 in case in which electric machine system 10 operates as an electric generator or electric motor.

In accordance with some examples of the disclosure, electric machine system 10 may be configured to remove heat from electric machine 12, e.g., to cool stator assembly 18 and/or machine housing 28, by pumping or otherwise transferring a fluid through a gap formed between stator assembly 19 and machine housing 28. As shown in FIG. 1, electric machine system includes inlet fluid flow conduit 24, outlet fluid flow conduit 26, and intermediate fluid flow conduit 27. Inlet fluid flow conduit 24 fluidically connects the outlet of pump 14 to electric machine 12 and outlet fluid flow conduit 26 fluidically connects electric machine 12 to optional heat exchanger 16. Intermediate fluid flow conduit 27 fluidically connects heat exchanger 16 to pump 14. Within the electric machine 12, the fluid may flow through a gap (not shown in FIG. 1) between stator assembly 18 and machine housing 28. In examples in which system 10 include heat exchanger 16, intermediate fluid flow conduit 27 may fluidically connect the outlet flow of heat exchanger 16 and the inlet of pump 14. In other examples not including heat exchanger 16, outlet fluid flow conduit 26 may fluidically connect the electric machine 12 to the inlet of pump 14. Each conduit may include any suitable structure such as piping or tubing that allows for a fluid passageway between respective components of system 10.

While FIG. 1 illustrates system 10 with fluid flow conduits 24, 26, and 27 fluidically coupling pump 14, electrical machine 12, and heat exchanger 16 directly to each other, in other examples, there may be additional components in the system other pump 14, electrical machine 12, and heat exchanger 16 that are not shown in FIG. 1. Those components may be fluidically connected to pump 14, electrical machine 12, and/or heat exchanger 16 or otherwise incorporated into system 10.

As described herein, stator assembly 18 may be secured or otherwise fixed to outer machine housing 28 using a press or interference fit using one or more corrugated rings. For example, although not shown in FIG. 1, electric machine 12 may include one or more corrugated rings which at least partially surround the circumference of the generally cylindrically-shaped stator assembly 18 and separate the circumference of stator assembly 18 from the adjacent inner walls of the surrounding outer machine housing 28. In such a configuration, the corrugated ring(s) may form a gap between the stator assembly 18 and adjacent machine housing 28. During, before, and/or after operation of electric machine 12, and using conduits 24, 26, and/or 27, pump 14 may pump a fluid through the gap between the stator assembly 18 and adjacent machine housing 28 to remove heat from stator assembly 18 and/or outer machine housing 28. The removal of heat from stator assembly 18 and/or outer machine housing 28 by transferring a fluid between the gap formed by the corrugated rings may cool, maintain a desired temperature, or reduce the rate of temperature increase of stator assembly 18, outer machine housing 28, an/or other components of electric machine 12 before, during, and/or after operation of electric machine 12.

Pump 14 may be any pump suitable for pumping or otherwise transferring a fluid through the gap formed between stator assembly 18 and machine housing 28 by the one or more corrugated rings. In some examples, pump 14 may take the form of a gear pump or centrifugal pump.

Heat exchanger 16 may be any heat exchanger suitable for removing heat from the fluid leaving electric machine 12 after being pumped or otherwise transferred through the gap formed between stator assembly 18 and machine housing 28 by the one or more corrugated rings. In some examples, heat exchanger 16 may take the form of a tube-fin or plate-fin device reject heat to ambient air, or to another closed or open-loop fluid circuit. The heat removed by heat exchanger 16 may be removed before the fluid is again pumped or otherwise transferred through the described gap by pump 14 in a closed loop fashion. In some examples, electric machine system 10 does not include heat exchanger 16 to remove heat from the fluid exiting electric machine 12. For example, when the heat removed from the fluid when the fluid travels through conduits 24, 26, and/or 27 removes an adequate amount of heat from the fluid after exiting electric machine 12, system 10 may not include heat exchanger 16 as a component of system 10.

Control circuitry 22 may include or may be one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "control circuitry" as used herein may refer to any of the foregoing structure or any other structure suitable for implementation of the techniques described herein. In addition, in some examples, the functionality of control circuitry 22 may be provided within dedicated hardware and/or software modules. In some examples, control circuitry 22 may be a component of, for example, a desktop computer, a laptop computer, a workstation, a server, a mainframe, a cloud computing system, or the like.

Control circuitry 22 is configured to control operation of system 10, including, for example, electric machine 12, pump 14, and/or heat exchanger 16. For example, control circuitry 22 may control the rate at which the fluid is pumped through the gap between stator assembly 18 and machine 28 by control pump 14. In this manner, control circuitry 22 may control the amount of heat removed from electric machine 12 with the fluid. Control circuitry control the operation of heat exchanger 16 to control the amount of heat removed from the fluid after the fluid exits electric machine 12. Control circuitry 22 may also control electric machine 12 in a manner that controls the amount of electricity generated by machine 12 when operating as an electric generator or that controls the amount of mechanical energy generated by machine 12 when operating as an electric motor. Computing device 22 may be communicatively coupled to at least one of electric machine 12, pump 14, or heat exchanger 16, using respective communication connections. Such connections may be wireless and/or wired connections.

One or more examples of electric machine 12 that are in accordance with some aspects of the disclosure are further described below with regard to FIGS. 2-8. However, other examples of electric machine 12 are contemplated other than that shown in FIGS. 2-8 are contemplated.

Figure 2:
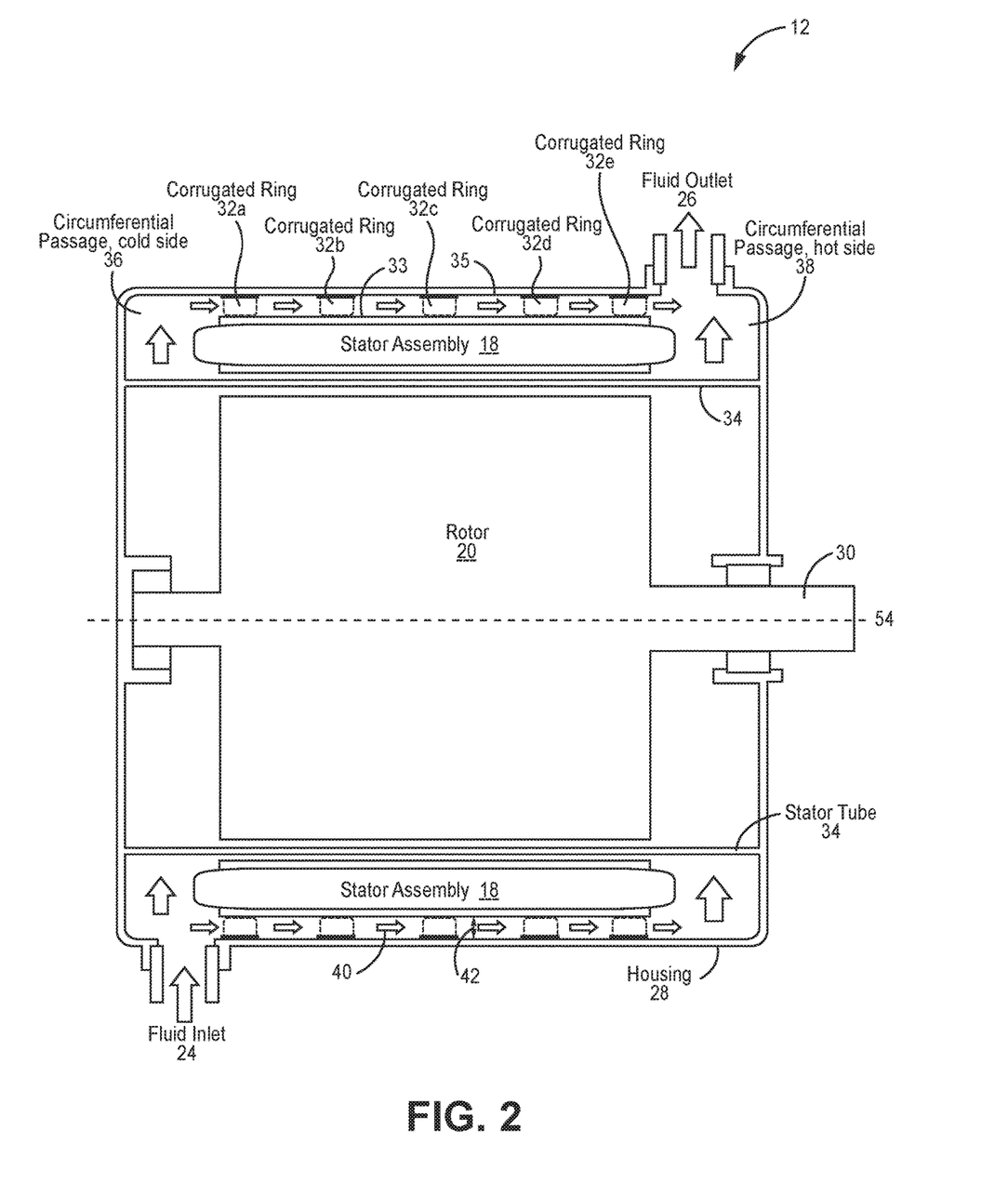
FIG. 2 is a conceptual and schematic diagram illustrating a cross-sectional view of example electric machine.

FIG. 2 is a conceptual and schematic diagram illustrating a cross-sectional view of example electric machine 12 which may be employed, e.g., by electric machine system 10 of FIG. 1. Rotor 20 of electrical machine rotates within stator assembly 18 about rotational axis 54. The cross-sectional view of FIG. 2 is taken along a plane that bisects the electric machine 12 about rotational axis 54 of rotor 20. As shown, electric machine 12 includes a plurality of corrugated rings 32*a*-32*e* (also referred to collectively corrugated rings 32) located between the outer surface 33 of stator assembly 18 and inner surface 35 of machine housing 28. The corrugated configuration of rings 32 provide for gap 42 between the outer perimeter of stator assembly 18 defined by outer surface 33 and inner surface 35 of machine housing 28.

Figure 3:
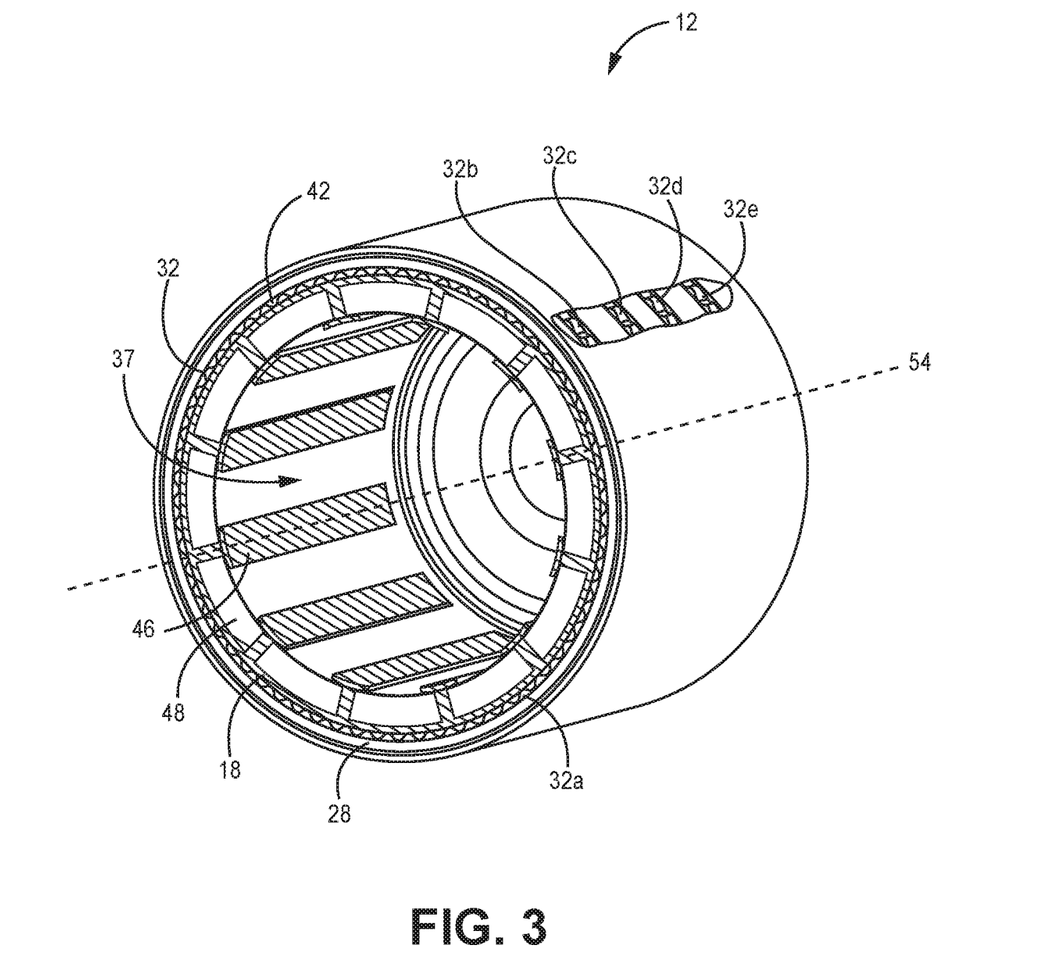
FIG. 3 is a diagram illustrating a portion of an example electric machine including a stator assembly within a machine housing separated from each other by corrugated rings.

FIG. 3 is a diagram illustrating a radial cross-sectional view of stator assembly 18, corrugated rings 32*a*-32*e*, and outer machine housing 28 of electric machine 12 taken along a cross-section of corrugated ring 32*a* shown in FIG. 2. For ease of illustration, the additional components of electric machine 12 shown in FIG. 2 are omitted from FIG. 3.

Figure 4:
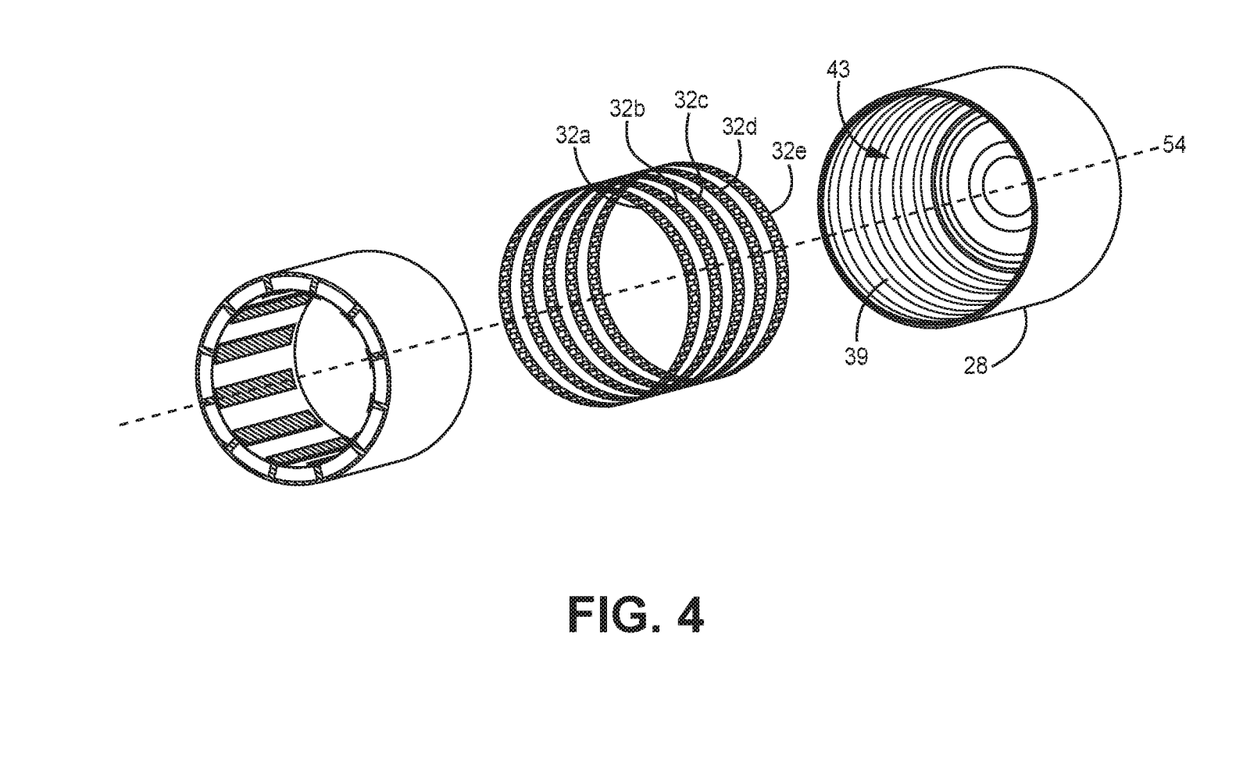
FIG. 4 is a diagram illustrating an exploded view of the portion of the electric machine shown in FIG. 3.

FIG. 4 is an exploded view of stator assembly 18, corrugated rings 32, and outer machine housing 28 of electric machine 12 shown in FIG. 4.

Figure 5:
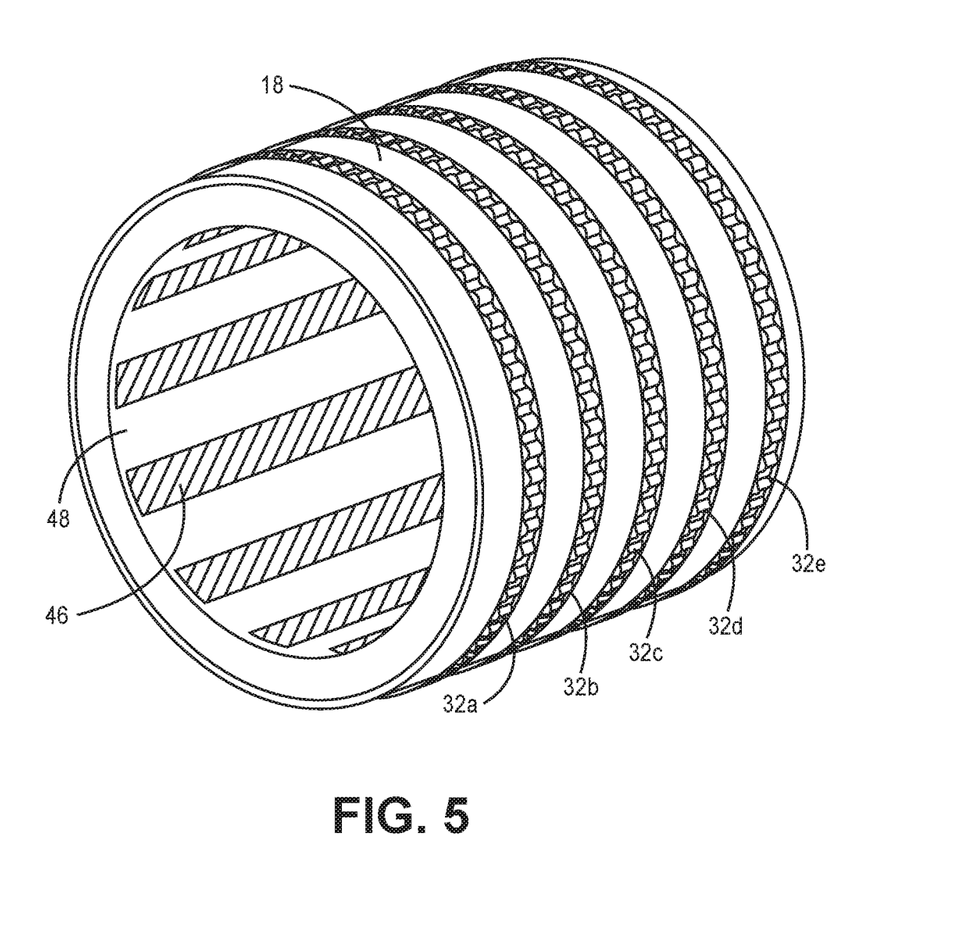
FIG. 5 is a diagram illustrating the stator assembly and corrugated rings of portion of the electric machine shown in FIG. 3.

FIG. 5 is a diagram illustrating stator assembly 18 and corrugated rings 32 of the portion of electric machine 12 shown in FIG. 3. Outer machine housing 28 is omitted from FIG. 5 for purposes of illustration.

Figure 6:
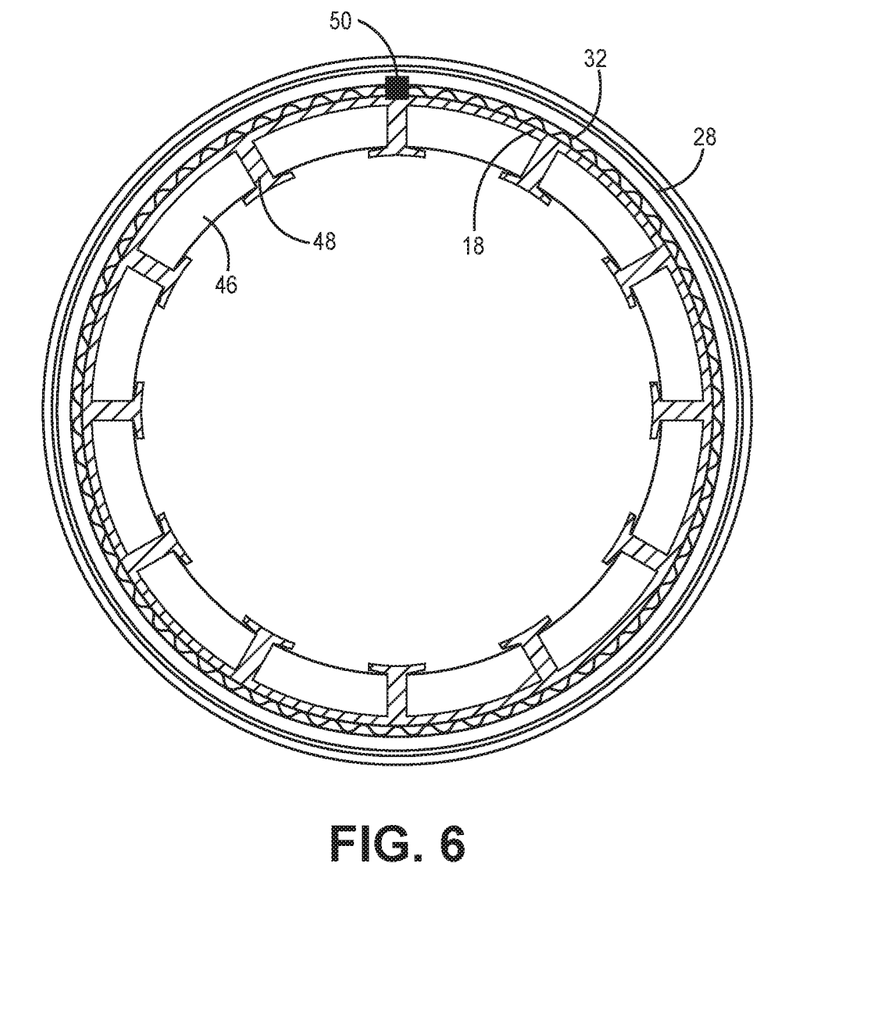
FIG. 6 is a diagram illustrating a cross-section view of the stator assembly and corrugated rings shown in FIG. 5.

FIG. 6 is a cross-sectional view of stator assembly 18, corrugated rings 32, and outer machine housing 28 of electric machine 12 shown in FIG. 5 along a cross-section bisection corrugated ring 32*a*.

Figure 7:
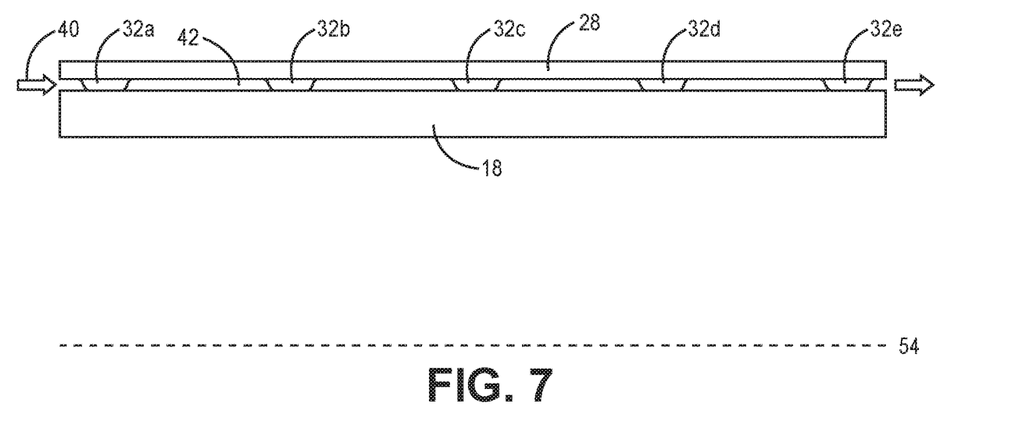
FIGS. 7 and 8 are diagrams illustrating two cross-sectional views of the electric machine of FIG. 3.
Figure 8:
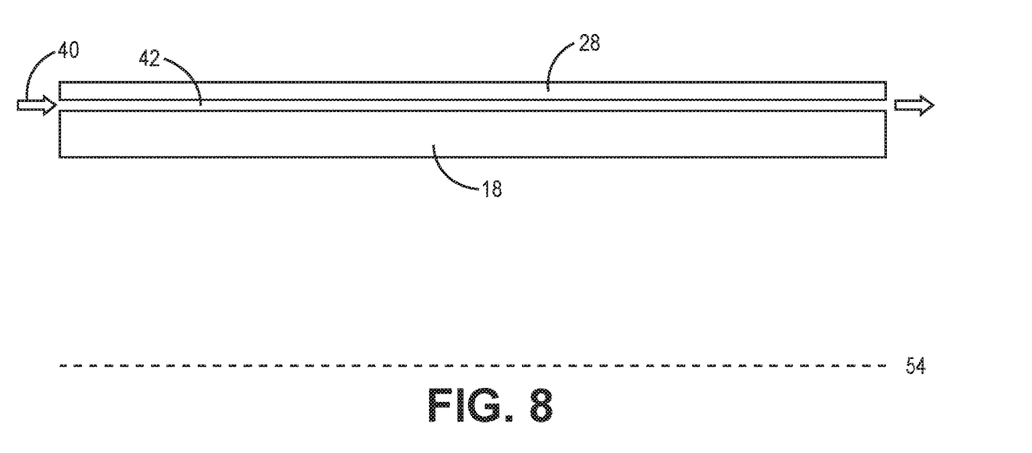

FIGS. 7 and 8 are diagrams illustrating two partial axial cross-sectional views of the electric machine 12 of FIG. 3.

As shown, e.g., in FIG. 2, rotor 20 and stator assembly 18 may be partially enclosed within machine housing 28, with shaft 30 of rotor 20 extending outside machine housing 20. Stator assembly 18 may have a substantially cylindrical shape having inner cavity 37 within which rotor 20 rotates relative to stator assembly 18 during operation. In some examples, inner cavity 37 of stator assembly 18 may be substantially cylindrical with rotor 20 having a corresponding cylindrical shape that fits within inner cavity 37 of stator assembly 18. Similarly, outer housing 28 may have a substantially cylindrical inner cavity 43 with stator assembly 18 having a corresponding cylindrical shape that fits within inner cavity 43 of outer housing 28. Inner cavity 43 of machine housing 28 may contain circumferential grooves 39 formed in inner surface 35 of housing which may be used to locate or maintain axial placement of the corrugated rings 32*a*-32*e*.

Outer housing 28 may be formed any suitable material, such as a metal or metal alloy. In examples, outer housing 28 may be formed of aluminum, steel, or titanium. Outer housing 28 may be formed using any suitable technique, such as machining, casting, or casting with machine finishing).

As shown, e.g., in FIGS. 3 and 6, stator assembly 18 includes a plurality of winding 48 wound about teeth 46. Windings 48 may take the form of an electrically conductive wire (e.g., copper wire, aluminum wire, or other suitably conductive material) coiled or spiraled about teeth 46. Teeth 46 may be any magnetically suitable material, such as an iron-based alloy. During operation, a current may be applied through windings 48, e.g., to rotate rotor 20 to generate mechanical power, or induced by the rotation of rotor 20, e.g., to generate electricity. Teeth 46 and/or windings 48 may increase in temperature during operation of electric machine 12, e.g., as a result of electrical resistance of the windings, or induced eddy currents. As described herein, electric machine 12 may be configured such that a fluid may be pumped or otherwise transferred in gap 42 between outer wall 33 of stator assembly 18 and inner wall 35 of housing 28 to remove heat from stator assembly 18 and/or housing 28 that would otherwise increase the temperature of stator assembly 18 and/or housing 28 during operation of electric machine 12. In some examples, teeth 46 and the outer "hoop" or cylinder of stator assembly 18 from which teeth 46 protrude may be a single part or component.

Electric machine 12 includes stator assembly 18 within inner cavity 43 of machine housing 28 with a plurality of corrugated rings 32 located between the outer surface 33 of stator assembly 18 and inner surface 35 of machine housing 28. Electric machine 12 may include only a single corrugated ring 32 or multiple corrugated rings 32. In the illustrated examples, electric machine 12 includes a total of five corrugated rings which are distributed about the axial length of stator assembly 18 at discrete locations, e.g., to support gap 42 between stator assembly 18 and outer housing 28 along the entire axial length of stator assembly 18. In other examples, electric machine 12 may include less than five or more than five corrugated rings 32. Corrugated rings 32 may include multiple individual rings that span only a portion of the axial length of stator assembly 18 or the substantially the entire length of stator assembly 18 in combination. In other examples, electric machine 12 may include only a single corrugated ring 32 that spans substantially the entire axial length of stator assembly or only a portion thereof.

The corrugated configuration of rings 32 provide for gap 42 between the outer perimeter of stator assembly 18 defined by outer surface 33 and inner surface 35 of machine housing 28. In some examples, corrugated rings 32 may be radially sprung rings (e.g., steel rings) that are designed to be press fitted between stator assembly 18 and outer housing 28. Corrugated rings 32 may have a "wavy" ring structure alternate between a plurality of peaks and valleys with the peaks being in contact with inner wall 35 of outer housing 28 and the valleys being in contact with outer wall 33 of stator assembly 18, e.g., as shown in FIG. 6. Each of the "waves" of corrugate rings 32 acts as an individual radial spring which, when the tolerance ring is in situ, transfers forces between stator assembly 18 and outer housing 28. Corrugate rings 32 are capable of handling direct torque transfer, torque slip, axial retention, controlled collapse, radial loading and differences in thermal expansion between stator assembly 18 and outer housing 28.

Gap 42 between outer wall 33 of stator assembly 18 and inner wall 35 of outer housing 28 may be any suitable width or distance. Gap 42 may be defined at least in part based on the amplitude of the "waves" of corrugated rings 32a-32e (which may be described as the height from a peak to a valley of corrugated rings 32. In some examples, gap 42 may be less than approximately 0.500 inches, greater than approximately 0.040 inches, from approximately 0.040 inches to approximately 0.500 inches, from approximately 0.080 inches to approximately 0.100 inches, approximately 0.200 inches, or approximately 0.300 inches. Other gap values are contemplated and may be based on system properties, and the desired effects e.g. fluid viscosity, pressure drop, temperature, flow rate, torque transfer, and radial load deflection.

Corrugated rings 32 may be formed of any suitable material including, e.g., hardened steel or nickel alloys. The material may have relatively high strength with spring-like qualities and the ability to deflect without permanently deforming. The substrate defining corrugated rings 32 may have a thickness of approximately 0.006 inches to approximately 0.062 inches. Other suitable thicknesses are contemplated and may be selected based on the size of electric machine 12 and radial force required.

In some examples, corrugated rings 32a-32e may each have substantially the same or different structure. For example, the amplitude (e.g., the height from a peak to a valley) and period (e.g., the distance between two peaks or two valley) of the "waves" defined by each individual corrugated ring 32a-32e may be substantially the same or different from each other. In some examples, the amplitude (e.g., the height from a peak to a valley) of each individual corrugated ring 32a-32e may be substantially the same such that gap 42 is substantially continuous between stator assembly 18 and outer housing 28. The amplitude may be substantially related to the size of radial gap 42. For example, the corrugated ring amplitude may be the same or greater than the size of gap 42 to maintain contact all around the circumference of stator assembly 18. A larger ratio of ring amplitude/gap 42, would drive a higher interference, and thus greater radial force between the stator assembly 18 and the machine housing 28. In some examples, the ring amplitude may be approximately equal to about 40% more than the size of gap 42, and may vary based on the selected material and desired compression. Further, the wave period may vary greatly with the size of the machine and the thickness of material. In some examples, the wave period may be substantially small enough such that the outer perimeter of stator assembly 18 is supported similar to a uniform pressure.

In some examples, corrugated rings 32 may form a continuous ring such that the corrugated structure extends all the way around outer wall 33 of stator assembly 18, e.g., around the entire outer perimeter of substantially cylindrical stator assembly 18, without any gaps. In other examples, one or more individual rings of corrugated rings 32 may have corrugated segments that only partially extend around outer wall 33 of stator assembly, e.g., the corrugated segments only partially extend around outer perimeter of substantially cylindrical stator assembly 18. For example, an individual ring of corrugated rings 32 may have a single corrugated segment or multiple corrugated segments, the ends of which may be separated by non-corrugated segments.

In some examples, the split section between the ends of corrugated segment(s) of a corrugated ring may be sized to accommodate one or more an anti-rotation keys. For example, with reference to FIG. 6, corrugated ring 32a includes a single corrugated segment with the ends of the segment separated by key 50. Key 50 may provide redundant torque transmission capability. For redundant torque transmission capability, key 50 may prevent rotation of the stator relative to the housing during a torque impulse. In other situations, the corrugated rings may not even be intended to carry any amount of torque, in which case key 50 may be the sole method of torque transmission. While the example of FIG. 6 only includes a single key, other examples are contemplated in which multiple keys are included, e.g., dispersed evenly or unevenly about the outer perimeter of stator assembly 18.

As shown in FIG. 2, outer housing 28 forms fluid flow passageway around outer wall 33 of stator assembly 18 in which a fluid may be transferred to remove heat from stator assembly 18 and/or machine housing 28, e.g., during operation of electric machine. A fluid may flow from inlet 24 to outlet 26 following flow path 40 through gap 42 between outer wall 33 of stator assembly 18 and inner wall 35 of machine housing 28. In some examples, pump 14 (FIG. 1) may control the flow of the fluid along flow path 40 to control the temperature of stator assembly 18 and/or outer machine housing 28, e.g., during operation of electric machine. The amount of heat removed from electric machine 12 by the fluid pumped or otherwise transferred within gap 42 may be a function of one or more variables including, e.g., the volumetric flow rate of the fluid within gap 42, the heat capacity of the fluid, the amount of heat removed from the fluid by heat exchanger 16, and the like. In some examples, system 10 may include, e.g., a binary pump speed as pump 14 and no temperature feedback. System 10 may be manipulated manually by a person to remove heat from electric machine 12 in addition to, or as an alternative to control circuitry 22. In some examples, system 10 may control the amount of heat removed from stator assembly 18 by modulating heat exchanger 16. For example, if the heat exchanger uses ground water or other fluid for cooling, the flow on the water/fluid side may be increased to lower the temperature of the machine coolant fluid without changing the pump speed or otherwise changing the rate of the fluid through gap 42.

As shown, e.g., in FIG. 2, after entering via inlet 24, a fluid may flow from circumferential passage 36 along fluid flow path 40 to circumferential passage 38, and then flow out of electric machine 12 via outlet 26. The fluid that flow within gap 42 along flow path 40 may be in contact with outer wall 33 of stator assembly 18 and/or inner wall 35 of outer housing. Heat may be transferred from stator assembly 18 and/or outer housing to the fluid that flows within gap 42 along flow path 40, which may function to cool stator assembly 18 and/or housing 28, e.g., before, during, and/or operation of electric machine to generate electricity or mechanical energy. In some examples, circumferential passage 36 and circumferential passage 38 may be referred to as the "cold" side and "hot" side, respectively, because, e.g., the "cool" fluid enters through inlet 24, then heat is transferred into the fluid from stator assembly 18 within gap 42, and then exits through circumferential passage 36 to outlet 26 at a higher temperature. Such circumferential passages may allow the fluid evenly distribute around the entire stator assembly 18 so it is evenly cooled.

Corrugated rings 32 may define gap 42 in a manner that provides for a relatively high amount of the overall surface area of outer wall 33 of stator assembly 18 and/or inner wall 35 of outer housing to be directly in contact with the fluid flowing in gap 42 along flow path 40. Such contact may allow for relatively high amount of convection heat transfer between the machine components and fluid. In some examples, at least 95 percent of outer wall 33 of stator assembly 18 on the radial outer perimeter may be in direct contact with the fluid flowing in gap 42 along flow path 40. In some examples, at least 90 percent inner wall 35 of outer housing 28 directly adjacent to the radial outer perimeter may be in direct contact with the fluid flowing in gap 42 along flow path 40.

Any suitable fluid may be transferred within gap 42 between stator assembly 18 and outer housing. In some examples, the fluid may be in a liquid phase when flowing within gap 42, e.g., during operation of electric machine 12. In some examples, the fluid may be a liquid at standard temperature and pressure (zero degree Celsius and 1 atmosphere). In other examples, the fluid may be in a vapor or mixed quality phase when flowing within gap 42, e.g., during operation of electric machine 12. In some examples, the fluid may have a heat capacity of at least approximately 1.50 kiloJoule/kilogram-Kelvin (kJ/kg-K), such as, e.g., at least approximately 3.50 kJ/kg-K, or from approximately 4.00 kJ/kg-K to approximately 4.20 kJ/kg-K. In some examples, the fluid may be water, oil, propylene glycol, ethylene glycol, polyalphaolefin, or mixtures thereof, or any other fluid with suitable corrosive and dielectric compatibility with the electric machine.

FIGS. 7 and 8 are diagrams illustrating two partial axial cross-sectional views of the electric machine 12 of FIG. 3. In FIGS. 7 and 8, outer housing 28, stator assembly 18, and corrugated rings 32 located between outer housing 28 and stator assembly 18 to define gap 42 are shown without rotor 20. Furthermore, only the "upper" portion of housing 28 above rotational axis 54 is shown for ease of illustration. In FIG. 7, the cross-section is shown at a radial position which aligns with respective protrusions of each of corrugated rings 32a-32e in the direction of fluid flow path 40. In FIG. 8, the cross-section is shown at a radial position which aligns with the spaces between the protrusions of each of corrugated rings 32a-32e in the direction of fluid flow path 40 (e.g., rotated a half wave period from the cross-section shown in FIG. 7). In some examples, the protrusions or peaks of each corrugated ring 32a-32e may be radially aligned such that a one radial position, a continuous fluid flow path is defined at gap 42 between stator assembly 18 and outer housing 28, and at another radial position, the depressions or valleys of each corrugated ring 32a-32e are aligned. In other examples, the protrusions or peaks of one or more of rings 32a-32e may align with the depressions or valleys of one or more other of rings 32a-32e. In other examples, the peaks and valleys of corrugated rings 32a-32e may not be radially aligned such that there is no radial position in which a fluid may flow in direction 40 without being interrupted by the structure of one or more of rings 32a-32e.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

Various examples have been described. These and other examples are within the scope of the following claims.

What is claimed is:

1. An electric machine system comprising:
   an outer housing;
   a stator assembly within the outer housing, wherein the stator assembly defines a first end in an axial direction and a second end in the axial direction;
   a plurality of corrugated rings located between an outer circumference of the stator assembly and an inner surface of the outer housing, the plurality of corrugated rings being located between the first end and the second end of the stator assembly, wherein the respective corrugated rings of the plurality of corrugated rings are spaced apart from each other in the axial direction of the stator assembly and define a gap between the stator assembly and the outer housing; and a pump configured to transfer a liquid through the gap between the stator assembly and housing, which gap is defined by the plurality of corrugated rings, to remove heat from at least one of the stator assembly or outer housing.

2. The electric machine system of claim 1, further comprising the liquid, wherein the liquid comprises at least one of water, oil, ethylene glycol, polyalphaolefin, or propylene glycol.

3. The electric machine system of claim 1, further comprising a heat exchanger external to the housing, wherein the pump is configured to transfer the liquid through the heat exchanger from the gap between the stator assembly and the housing, and wherein the heat exchanger is configured to remove heat from the liquid.

4. The electric machine system of claim 1, wherein the gap defined by the plurality of corrugated rings is between approximately 0.040 inches and approximately 0.500 inches.

5. The electric machine system of claim 1, wherein at least one corrugated ring of the plurality of corrugated rings extends only partially circumferentially around the stator assembly between the stator assembly and housing such that there is a circumferential gap between a first end of the at least one corrugated ring and a second end of the at least one corrugated ring, further comprising a key positioned in the circumferential gap such that the key is between the first end and the second end of the at least one corrugated ring around the stator assembly, wherein the key is configured to transfer a torque force from the stator assembly to the housing and prevent rotation of the stator assembly relative to the outer housing.

6. The electric machine of claim 1, further comprising control circuitry configured to control a rate at which the pump transfers the liquid through the gap between housing and the stator assembly.

7. The electric machine of claim 1, wherein a rate at which the pump transfers the liquid through the gap between the housing and the stator assembly varies to vary an amount of heat removed from the stator assembly.

8. The electric machine system of claim 1, wherein the electric machine comprises at least one of an electric generator configured to generate electrical energy from mechanical energy or an electric motor configured generate mechanical energy from electrical energy.

9. The system of claim 1, wherein the stator assembly is attached to the outer housing via a press fit using the plurality of corrugated rings positioned between an outer circumference of the stator assembly and an inner wall of the surrounding outer housing, and wherein each corrugated ring of the plurality of corrugated rings defines an undulating member that is configured to transfer force between the stator assembly and the outer housing to allow for expansion and contraction between the stator assembly and outer housing while maintaining the attachment between the stator assembly and outer housing.

10. The system of claim 1, wherein each corrugated ring of the plurality of corrugated rings includes a undulating member defining a plurality of peaks adjacent the outer housing alternating with a plurality of valleys adjacent the stator assembly, and wherein respective peaks of each corrugated ring of the plurality of corrugated rings are radially aligned with each other such that a one radial position outside the stator assembly, a continuous fluid flow path is defined through the respective peaks, and at another radial position, respective valleys of the plurality of valleys of each corrugated ring are radially aligned.

11. The system of claim 1, wherein the plurality of corrugated rings are not attached to each other.

12. A method comprising transferring, via a pump, a liquid through a gap between a stator assembly and an outer housing of an electric machine, the liquid being transferred to remove heat from at least one of the stator assembly or housing, wherein the electric machine includes: the outer housing, the stator assembly within the outer housing, and a plurality of corrugated rings located between the stator assembly and the outer housing, wherein respective corrugated ring of the plurality of corrugated rings are spaced apart from each other in an axial direction of the stator assembly and define the gap between the stator assembly and the outer housing.

13. The method of claim 12, wherein the liquid comprises at least one of water, oil, or propylene glycol.

14. The method of claim 12, wherein the electric machine includes a heat exchanger external to the housing, wherein the pump is configured to transfer the liquid through the heat exchanger from the gap between the stator assembly and the housing, and wherein the heat exchanger is configured to remove heat from the liquid.

15. The method of claim 12, wherein the gap defined by the plurality of corrugated rings is between approximately 0.040 inches and approximately 0.500 inches.

16. The method of claim 12, wherein at least one corrugated ring of the plurality of corrugated rings extends only partially circumferentially around the stator assembly between the stator assembly and housing such that there is a circumferential gap between a first end of the at least one corrugated ring and a second end of the at least one corrugated ring, further comprising a key positioned in the circumferential gap such that the key is between the first end and the second end of the at least one corrugated ring around the stator assembly, wherein the key is configured to transfer a torque force from the stator assembly to the housing and to prevent rotation of the stator assembly relative to the outer housing.

17. The method of claim 12, further comprising varying a rate at which the pump transfers the liquid through the gap between the housing and the stator assembly to vary an amount of heat removed from the stator assembly.

18. An electric machine system comprising:
an outer housing;
a stator assembly within the outer housing;
a corrugated ring located between the stator assembly and the outer housing, the corrugated ring defining a gap between the stator assembly and the outer housing, wherein the corrugated ring extends only partially circumferentially around the stator assembly between the stator assembly and housing such that there is a circumferential gap between a first end of the corrugated ring and a second end of the corrugated ring;
a pump configured to transfer a fluid through the gap between the stator assembly and housing to remove heat from at least one of the stator assembly or outer housing; and
a key positioned in the circumferential gap such that the key is between the first end and the second end of the corrugated ring around the stator assembly, and wherein the key is configured to transfer a torque force from the stator assembly to the outer housing and to prevent rotation of the stator assembly relative to the housing.

\* \* \* \* \*